United States Patent [19]

Shashidhar et al.

[11] Patent Number: 5,293,261
[45] Date of Patent: Mar. 8, 1994

[54] DEVICE FOR LOW ELECTRIC-FIELD INDUCED SWITCHING OF LANGMUIR-BLODGETT FERROELECRIC LIQUID CRYSTAL POLYMER FILMS

[75] Inventors: Ranganathan Shashidhar, Springfield; Jawad Naciri, Falls Church, both of Va.; Sebastian Pfeiffer, Washington, D.C.; Thomas L. Fare, Glenside, Pa.

[73] Assignees: The United States of America as represented by the Secretary of the Navy, Washington, D.C.; Geo-Centers, Inc., Newton Centre, Mass.

[21] Appl. No.: 999,619

[22] Filed: Dec. 31, 1992

[51] Int. Cl.$^5$ .................... G02F 1/13; G02F 1/1343
[52] U.S. Cl. .................... 359/087; 359/103; 359/104
[58] Field of Search .................... 359/87, 89, 103, 104

[56] References Cited

U.S. PATENT DOCUMENTS

| Re. 33,914 | 5/1992 | Robillard | 250/331 |
| 5,036,197 | 7/1991 | Voles | 250/332 |
| 5,047,644 | 9/1991 | Meissner et al. | 250/332 |
| 5,079,200 | 1/1992 | Jackson | 501/136 |
| 5,079,420 | 1/1992 | Turnbull | 250/338.3 |
| 5,087,816 | 2/1992 | Robin et al. | 250/338.3 |
| 5,091,646 | 2/1992 | Taylor | 250/332 |
| 5,093,735 | 3/1992 | Doane et al. | 359/52 |
| 5,095,211 | 3/1992 | Kimata | 250/370.08 |
| 5,099,120 | 3/1992 | Turnbull | 250/338.2 |
| 5,109,158 | 4/1992 | Horne | 250/332 |
| 5,120,664 | 6/1992 | Murotani | 437/2 |
| 5,120,960 | 6/1992 | Halvis | 250/338.4 |
| 5,130,259 | 7/1992 | Bahraman | 437/5 |
| 5,146,302 | 9/1992 | Kumada | 357/24 |
| 5,151,595 | 9/1992 | Filo | 250/316.1 |
| 5,159,198 | 10/1992 | Kohsaka et al. | 250/330 |
| 5,164,832 | 11/1992 | Halvis et al. | 358/213.19 |
| 5,168,338 | 12/1992 | Kumada et al. | 307/311 |
| 5,171,994 | 12/1992 | Bahraman | 250/332 |

OTHER PUBLICATIONS

Soref, "Field effects in nematic liquid crystals obtained with interdigital electrodes", Journal of Applied Physics, vol. 45, No. 12 (Dec. 1974), pp. 5466–5468.

Ali-Adid et al, Langmuir, vol. 7, (1991), pp. 363–366, "Liquid Crystal Side Chain Copolymers as Langmuir-Blodgett and Magnetically Aligned Thin Films".

Penner et al, Macromolecules, vol. 24, (1991), pp. 1041–1049, "Oriented Films from Polymeric Amphiphiles with Mesogenic Groups: Langmuir-Blodgett Liquid Crystals?".

Jones et al., IEEE Transactions on Ultrasonics, Ferroelectrics, and Frequency Control, vol. 35, No. 6, (Nov. 1988), pp. 736–740, "Langmuir-Blodgett Films: A New Class of Pyroelectric Materials".

Ding-Quan et al, IEEE Transactions on Electrical Insulation, vol. 23, No. 3 (Jun. 1988), pp. 503–516, "Measurement Applications Based on Pyroelectric Properties of Ferroelectric Polymers".

Roberts et al, Thin Solid Films, vol. 180, (1989), pp. 211–216, "Thermal Imaging Using Organic Films".

Garoff et al, Physical Review Letters, vol. 38, No. 15, pp. 848–851 (Apr. 1977), "Electroclinic Effect at the A–C Phase Change in a Chiral Smectic Liquid Crystal".

(List continued on next page.)

Primary Examiner—William L. Sikes
Assistant Examiner—Anita Pellman Gross
Attorney, Agent, or Firm—Oblon, Spivak, McClelland, Maier & Neustadt

[57] ABSTRACT

Devices in which a Langmuir-Blodgett film of a liquid crystal polymer is disposed between electrodes on the surface of a substrate exhibit fast ferroelectric switching in response to an electric field generated by the electrodes, and Langmuir-Blodgett films of a liquid crystal polymer exhibit pyroelectric properties even at thicknesses below 10–15 μm.

20 Claims, 11 Drawing Sheets

OTHER PUBLICATIONS

Naciri et al, *Liquid Crystals*, vol. 10, No. 4, pp. 585-591 (1991), "Fast swiching ferroelectric side-chain liquid-crystalline polymer and copolymer".

Beresnev et al, *Liquid Crystals*, vol. 5, No. 4, pp. 1171-1177 (1989), "Deformed helix ferroelectric liquid crystal display: a new electrooptic mode in ferroelectric chiral smectic C liquid crystals".

Yoshino et al, [Japanese Journal of Applied Physics, vol. 23, No. 6, pp. L385-L387 (Jun. 1984) "New Electro-Optic Effect of Microsecond Response Utilizing Transient Light Scattering in Ferroelectric Liquid Crystal".

Clark et al, *Appl. Phys. Lett.*, vol. 36, No. 11, pp. 899-901 (Jun. 1980) "Submicrosecond bistable electro-optic switching in liquid crystals".

Rettig et al, *Thin Solid Films*, vol. 210/211, pp. 114-117 (1992), "The behavior of ferroelectric liquid crystalline compounds at the air-water interface".

Fünfschilling et al, *J. Appl. Phys.*, vol. 66, No. 8, pp. 3877-3882 (Oct. 1989), "Fast responding and highly muliplexible distorted helix ferroelectric liquid-crystal displays".

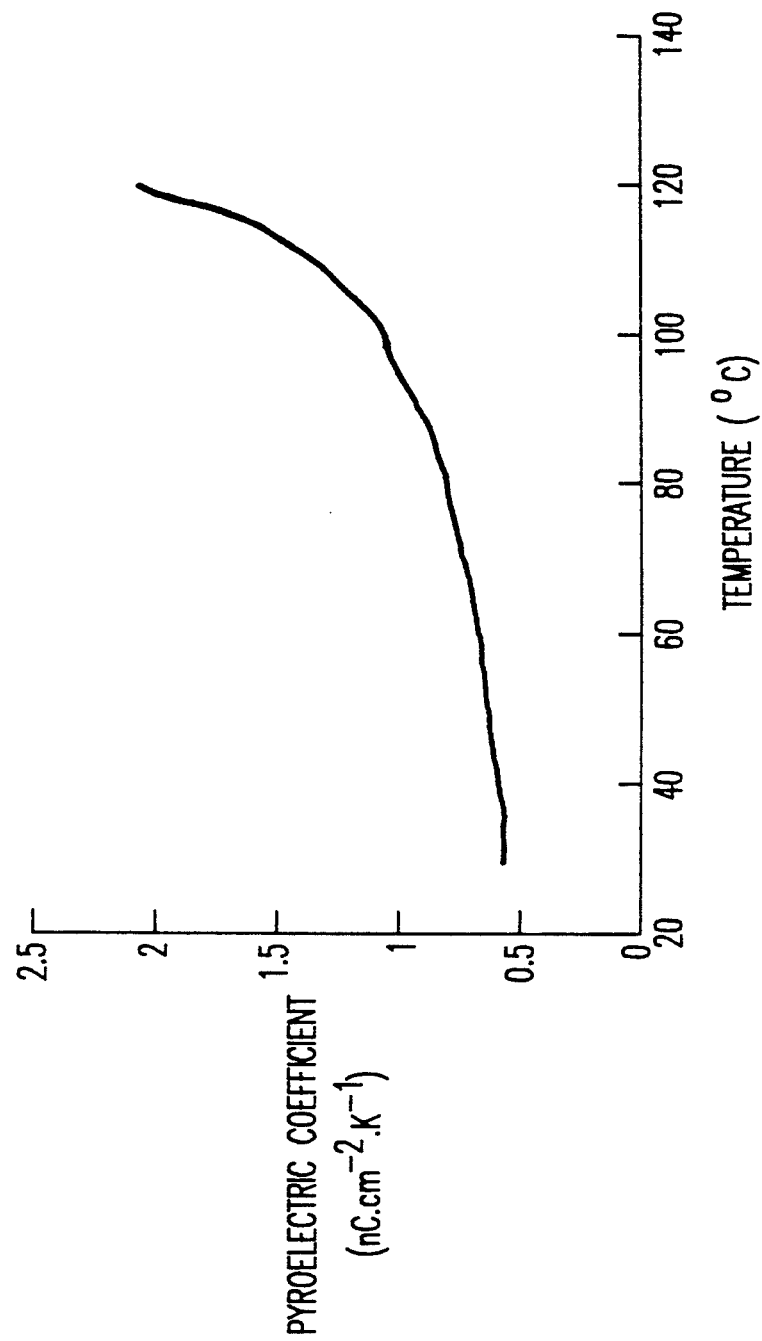

DEVICE FOR LOW ELECTRIC-FIELD INDUCED SWITCHING OF LANGMUIR-BLODGETT FERROELECRIC LIQUID CRYSTAL POLYMER FILMS

BACKGROUND OF THE INVENTION

1. Field of the Invention

The present invention relates to novel ferroelectric liquid crystal devices.

2. Discussion of the Background

For display purposes, liquid crystal (LC) and liquid crystal polymer (LCP) films are typically sandwiched between two transparent, conducting electrodes (usually, indium tin oxide, ITO) set apart at some fixed distance by a spacer. A voltage is applied across the electrodes, inducing a field in the film. Fields in the film are calculated by dividing the voltage by the spacer distance and are typically on the order of $10^5$ V/cm for LCPs. Changing the voltage across the electrodes can cause LCs and LCPs to switch. To monitor the effects of changing the potential, a polarizer is set parallel to the film; switching can be observed as the change in light intensity transmitted through the polarizer-film set-up.

It was first shown by Meyer et al (R. B. Meyer et al, *J. Phys. Lett.*, vol. 36, L69 (1975)) that the smectic-C phase of chiral molecules (SmC*) is a ferroelectric liquid crystal (FLC). This was followed by the demonstration of fast electro-optic switching (in the range of $\mu$s) and optical bistability in surface-stabilized ferroelectric liquid crystal (SSFLC) displays (N. A. Clark et al, *Appl. Phys. Lett.*, vol. 36(11), 899 (1980)). In the material is enclosed between two conducting glass substrates whose surfaces are "pre-treated" to cause the molecules to lie in the plane of the substrate. Thus, the molecules are held in one of their two electrically addressable, optically different states through their interaction with the surfaces of the cell. This memory effect in combination with relatively fast switching has made FLCs attractive for electro-optic applications.

Other electro-optic effects in FLCs using birefringence are the transmit scatter mode (TSM) (K. Yoshino et al, *Jap. J. Appl. Phys.*, vol. 2, L385 (1984)), deformed helix ferroelectric (DHF) (J. Fünfschilling et al, *J. Appl. Phys.*, vol. 66(8), 3877 (1989); and L. Beresnev et al, *Liq. Cryst.*, vol. 5, 1171 (1989)), short pitch ferroelectric (SPF) (J. Fünfschilling et al, *SID 90 Digest*, 106 (1990)) and soft-mode effect (S. Garoff et al, *Phys. Rev. Let.*, vol. 38, 848 (1977)). While these effects are observed in sandwich cells with a planar alignment of the molecules, there have also been recent reports on different sample confinements like free-standing SmC* films (G. Hauck et al, *Ferroelectrics*, vol. 122, 253 (1991)) and homeotropically aligned sandwich cells (M. Ozaki et al, *Japan. J. Appl. Phys.*, vol. 30(9B), 2366 (1991)); in the latter case, a change in transmission could be observed with oblique incident light.

As noted above, ferroelectric LCP display devices generally use the SSFLC geometry, in which the material is enclosed between two conducting glass substrates whose surfaces are "pretreated" to cause the molecules or mesogenic groups to lie in the plane of the substrate. Although the switching times of such SSFLC devices are on the order of $\mu$s, devices with even faster switching times are desired. Further, such SSFLC devices are required to have at least two substrates and an intervening layer of LCP (having a thickness of about 2-4 $\mu$m).

Thus, such SSFLC devices typically have a thickness on the order of about 4 $\mu$m, and thinner devices are desired.

One constraint on the thickness of SSFLC devices arises from the surface irregularities present on the top and bottom plates. Thus, the thickness of the LC layer between the two plates must be at least 2-4 $\mu$m to prevent a short circuit between the top and bottom surfaces.

Thus, there remains a need for thin ferroelectric LCP devices which exhibit fast ferroelectric switching times. In particular, there remains a need for devices in which short circuiting between the top and bottom plates sandwiched about a LC film is not a problem.

In addition, pyroelectric materials are useful for use in infrared (IR) sensors or imaging devices. Currently, the limitation on IR imaging capability (a combination of sensitivity and resolution) is the thickness of available pyroelectric materials. In particular, there is a need for materials which exhibit pyroelectric properties even at thicknesses below 10 $\mu$m. However, currently available materials lose their pyroelectric properties at thicknesses below 10 to 15 $\mu$m.

Thus, there remains a need for materials which exhibit pyroelectric properties at thicknesses lower than 10 to 15 $\mu$m. In particular, there remains a need for materials which exhibit pyroelectric properties at such low thicknesses and are suitable for use in IR sensor and/or imaging devices.

Langmuir-Blodgett (LB) films of LCP and LC oligomers have been reported (see: Z. Ali-Adid et al, *Langmuir*, vol. 7, 363 (1991) and Penner et al, *Macromolecules*, vol. 24, 1041 (1991)). However, to date, there are no reports on the ability of a LB film of a LCP to undergo electric field-induced ferroelectric switching.

In addition, pyroelectric materials based on ferroelectric polymers have been reported (Ding-Quan et al, *IEEE Transactions on Electrical Insulation*, vol. 23, p. 503 (1988)), and there are also reports of the pyroelectric properties of LB films (see: Jones et al, *IEEE Transactions on Ultrasonics, Ferroelectrics, and Frequency Control*, vol. 35, p. 737 (1988) and Roberts et al, *Thin solid Films*, vol. 180, p. 211 (1989); However, to date there are no reports of any LB films of a LCP exhibiting pyroelectric properties.

SUMMARY OF THE INVENTION

Accordingly, it is one object of the present invention to provide novel liquid crystal devices which are thin.

It is another object of the present invention to provide novel liquid crystal devices which exhibit fast switching times.

It is another object of the present invention to provide novel liquid crystal devices in which short circuiting between top and bottom plates sandwiched about an LC film is not a problem.

It is another object of the present invention to provide materials which exhibit pyroelectric properties even at thicknesses less than 10 to 15 $\mu$m.

It is another object of the present invention to provide such thin pyroelectric materials which are suitable for use in an IR sensor and/or imaging device.

These and other objects, which will become apparent during the following detailed description, have been achieved by the inventors' discoveries that Langmuir-Blodgett films of ferroelectric liquid crystalline polymers exhibit fast ferroelectric switching and that such Langmuir-Blodgett films of ferroelectric liquid crystalline polymers exhibit pyroelectric properties even at thicknesses less than 10–15 μm.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein:

FIG. 11 shows the temperature dependence of the Pyroelectric Coefficient (nC·cm$^{-2}$·K$^{-1}$) for a 30-layer LB film of 8PPB2-Co. The pyroelectric coefficient $dP_s/dT$ has been obtained as the first derivative of the fit to the experimental $P_s(T)$ data in FIG. 8. The fit has the form $P_s = P_o·((T_{AC}-T)/T_{AC})·\exp(0.5)$ with the SmA-SmC* transition temperature $T_{AC} = 125°$ C. and $P_o = 125.99$ nC/cm$^2$; $P_o$ is the only free fit variable.

DETAILED DESCRIPTION OF THE PREFERRED EMBODIMENTS

Figure 1A:
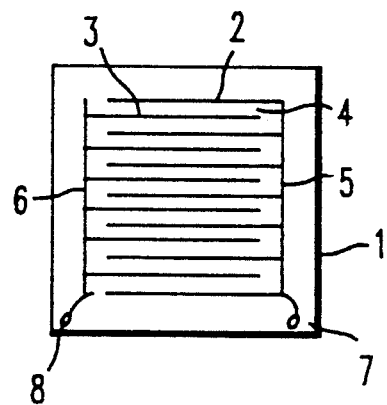
FIGS. 1a–1c depict various arrangements of electrodes on the surface of the device of the present invention.

Thus, the present invention relates to a LC device, comprising (a) a substrate, (b) at least one pair of electrodes disposed on said substrate, and (c) a LB ferroelectric LCP film disposed on said substrate and between said pair of electrodes.

The substrate may be any of those commonly used in LCP devices. The only restrictions on the substrate are that: (1) it is nonconductive, and (2) it can support a stable LB film of the LCP being used. Examples of suitable substrates include glass, quartz, silica, ceramics, polymers (flexible and rigid), optical fibers, metals, and semiconductor surfaces, etc.

Depending on the type of LCP being used, it may be desirable to treat the surface of the substrate to render it either hydrophobic or hydrophilic. Thus, when using a LCP with a relatively hydrophobic backbone, such as a silicone side chain LCP, it may be desirable to treat the surface to render it hydrophobic. Such hydrophobization treatments are well known to those skilled in the art. For example a glass surface may be rendered hydrophobic by treatment with an alkyl halosilane, such as octadecyl trichlorosilane. If the surface already possesses a hydrophobic surface then no treatment is required.

Alternatively, if the LCP to be used has a relatively hydrophilic backbone, such as an acrylic or 2-hydroxyethyl acrylate side chain LCP, then it may be desirable to treat the surface of the substrate to render it hydrophilic. Again, such hydrophilization treatments are well known to those skilled in the art and include techniques such as plasma etching, acid or base wash, etc. Of course, if substrate already possesses a hydrophilic surface then no treatment is necessary.

There are no particular size or shape limitations on the substrate. Thus, the substrate may be of any size or shape convenient for use in a LCP device. Typically, the substrate will be in the form of a flat sheet to afford a device of minimal thickness. Although the exact thickness of the sheet will depend, in part, on the end use of the device and the composition of the substrate, good results have been achieved using glass substrates having a thickness of 0.8 mm to 2 mm, preferably 0.9 mm to 1.2 mm.

The electrodes, disposed on the surface may be any which are capable of generating an electric field of sufficient strength to induce the ferroelectric switching of a LB film of a LCP disposed between a given pair of electrodes. Typically, the field strengths required to induce such ferroelectric switching range from $10^4$ to $3 \times 10^5$ V/cm. The electrodes may be of any material suitable for the generation of such electric fields. Suitable materials include indium tin oxide, polysilicon, conducting polymers and metals, such as gold, silver, aluminum, and copper. Preferably the metal is gold, because it is chemically inert.

There are no particular size or shape limitations on the electrodes. However, it is preferable that the height of the electrode above the surface of the substrate be greater than the thickness of the LCP LB film disposed on the substrate and between the electrodes. In the interest of keeping the device thin, the electrodes are usually only slightly higher than the thickness of the LCP LB film. Thus, the electrodes are typically about 25 to 1000 nm high, preferably about 50 to 500 nm high.

With regard to the remaining dimensions of the electrodes, it will be readily understood that the overall resolution of the device will be limited by the thickness of the electrodes. Thus, although there are no particular limitations on the length and the thickness of the electrodes employed in the present devices, one will normally utilize electrodes which have a thickness which is small enough to achieve the overall resolution desired. For example, if a resolution of about 5 mm is desired, electrodes having a thickness of about $\leq 500$ $\mu$m should be used. By employing modern photolithographic techniques for the preparation of the electrodes, it is possible to construct electrodes having a thickness as low as a few nm. Such photolithographic techniques are described and reviewed in L. F. Thompson et al, *Introduction to Microlithography*, ACS Symposium Series, Washington, D.C. (1983), which is incorporated herein by reference.

The particular shape and orientation of the electrodes will depend on the image or pattern desired to be displayed or created on the device. In the examples discussed below, a pattern of stripes or bands is created by utilizing a set of interdigitated electrodes as shown in FIG. 1a. By placing opposing charges on the two sets of electrodes (2 and 3) on the substrate (1), an electric field is created in the regions (4) between the electrodes. When the charges on electrodes (2 and 3) are reversed, the direction of the field will reverse and the LCP LB film disposed in regions (4) will undergo ferroelectric switching.

In the device of FIG. 1a, each set of electrodes (2 and 3) is connected a single bus line (5 and 6), which in turn is connected to a single contact pad (7 and 8). Thus, the individual electrodes within each set are not individually addressable.

Figure 1B:
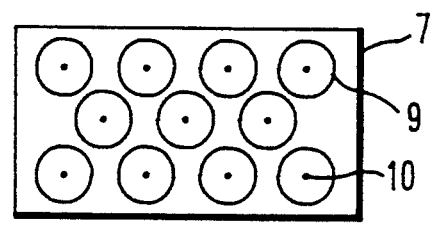
Figure 1C:
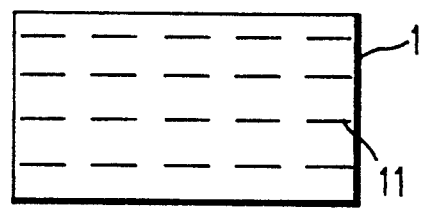

Other electrode arrangements are shown in FIGS. 1b-c. In FIG. 1b, a series dots is created by utilizing a set of circular electrodes (9) with another electrode (10) located at the center of each circular electrode (9). In FIG. 1c, a pattern of squares or rectangles is created by utilizing an array of linear electrodes (11).

As noted above, in the interdigitated electrode pattern shown in FIG. 1a, the individual electrodes within each of the two sets are not individually addressable. However, in some applications it will be desirable to be able to address individual electrodes or pairs. This may be achieved in the interdigitated pattern by providing each electrode with its own contact pad or contact point rather than connecting each electrode to a bus line.

In the patterns shown in FIGS. 1b and c it may be desirable to make electrical contact with each electrode from beneath the LCP LB film. In some instances, when the polarization of the material is large, it may be desirable to provide an insulating coating over the electrical contact means such that the LCP LB film is separated from the electrical contact means by the insulating coating. This may be required to reduce the space charge effect.

The LCP used in the LB film in the present device may be any which will form a stable LB film and will undergo ferroelectric switching while in a LB film. Examples of such LCPs include ferroelectric LCPs with poly(meth)acrylic, poly(meth)acrylate, and polysiloxane backbones. Such LCPs are described in *Polymer Liquid Crystals*, Finkleman and Ciferri eds, Academic Press, N.Y. 1982, which is incorporated herein by reference. Particularly good results have been achieved by using polysiloxane ferroelectric LCPs having the general formula (I):

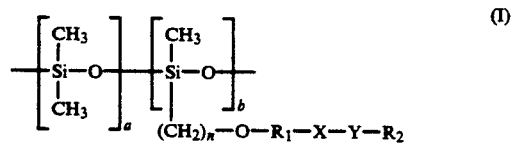

wherein monomer a is present in an amount of 0.1 to 0.9 mole % and monomer b is present in an amount of 0.1 to 0.9 mole % and wherein $R_1$ is 1,4-phenylene or 4,4'-biphenylene; X is —COO— or —OCO—; Y is

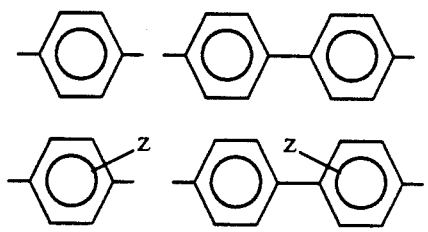

and $R_2$ is

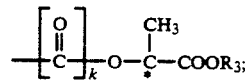

in which k is 0 or 1; * denotes an optically active center; Z is $NO_2$, F, or Cl; $R_3$ is $C_lH_{2l+1}$, —*CH(CH_3)C_pH_{2p+1}$ —$CH_{2l}$ $C_qF_{2q+1}$, —*CH(CH_3)COOC_rH_{2r+1}$ (l and p are each independently an integer of from 1 to 10 and q and t are each independently an integer of from 1 to 6); and n is an integer of 4 to 12. Preferably, the ratio b/(a+b) is from 0.2 to 0.8, most preferably 0.2 to 0.4. Suitably, the LCP has a number average degree of polymerization, $\overline{DP}_n$, of 5 to 75. The synthesis of such LCPs are described in U.S. patent application Ser. No. 07/892,951, which is incorporated herein by reference. Some particularly preferred LCPs within the context of the present invention devices are shown in the table given below:

| n | —$R_1$—X—Y— | —$R_3$ | Copolymer |
|---|---|---|---|
| 6 | ⬡—⬡—COO—⬡ | —$C_2H_5$ | 6PPB2-CO |

-continued

| n | —R₁—X—Y— | —R₃ | Copolymer |
|---|---|---|---|
| 8 | phenyl–phenyl–COO–phenyl | —C₂H₅ | 8PPB2-CO |
| 10 | phenyl–phenyl–COO–phenyl | —C₂H₅ | 10PPB2-CO |
| 10 | phenyl–phenyl–COO–phenyl | —C₆H₁₃ | 10PPB6-CO |
| 10 | phenyl–phenyl–COO–phenyl | $-\overset{*}{C}HC_6H_{13}$ with CH₃ | 10PPBM7-CO |
| 10 | phenyl–phenyl–COO–phenyl | —CH₂C₂F₅ | 10PPBF2-CO |
| 10 | phenyl–COO–phenyl–phenyl | —C₂H₅ | 10BPB2-CO |

Copolymer: $b/(a + b) = 0.3$  $\overline{DP_n} = 30-35$

The devices of the present invention may be prepared by the following procedure. First, at least a pair of electrodes is provided on the surface of the substrate. Second, a LCP LB film is coated on the device such that the surface of the substrate between the electrodes is coated with the LCP LB film. As noted above, the electrodes may be formed on the substrate by any suitable conventional technique such as photolithography.

Figure 2:
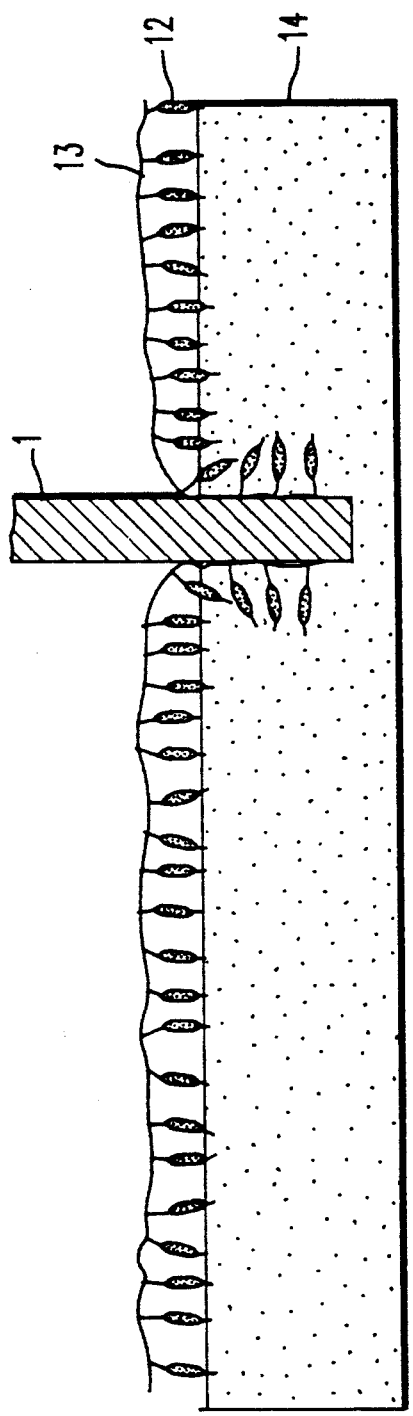
FIG. 2 illustrates a method of preparing a LB film of a LCP on a substrate by dipping the substrate into a water reservoir having a monomolecular LCP film disposed on the surface.

The LCP LB film may be formed by conventional dipping techniques, such as those described in Z. Ali Adid et al, *Langmuir*, vol. 7, 363 (1991) and Penner et al, *Macromolecules*, vol. 24, 1041 (1991), which are incorporated herein by reference. The dipping procedure is shown schematically in FIG. 2. As shown in FIG. 2, the LCP LB film may be formed on the substrate (1) by dipping the substrate (1) into a reservoir of water (14) on which a LCP film is present. In FIG. 2, the LCP has side chain mesogenic groups (12) with hydrophilic groups and a hydrophobic backbone (13).

Typically, pressure is applied to the film on the water by means of movable barriers. Suitably, the surface pressure is 10 to 50, preferably 20 to 35 mN/m. The substrate is dipped at a rate of 1 to 10, preferably 4 to 6 mm/min. It may be desired to hold the substrate at rest for a time of 10 to 300 sec, preferably 60 to 120 sec, after each downward (upward) stroke in the dipping process before starting the next upward (downward) stroke.

In this way, it is possible to create LB films containing multiple layers of the LCP. Usually, the LB film will contain 1 to 120 layers of LCP, preferably 5 to 50 layers of LCP.

Further, by applying either a hydrophobization or hydrophilization treatment to the top surface of the electrodes on the substrate it is possible to form the LB film exclusively on the substrate and not on the top of the electrodes.

The present devices may be operated by applying a potential across a given pair of electrodes. Typically, such a potential will have a strength of 4 to 160 V, preferably 8 to 80 V. By reversing the direction of the electric field between a pair of electrodes, the LCP disposed between the pair of electrodes will be made to switch.

The present devices are useful in applications such as electro-optic displays, pyroelectric sensors, IR imaging devices, piezoelectric sensors, and biosensors.

The use of the present devices in the application of electro-optic displays may be achieved by configuring a pattern of electrodes on the surface so as to create an array of pixels which may be addressed individually and/or in groups. Thus, by controlling the potential across any given pair of electrodes, it is possible to create a pattern or image of regions of different polarization which may be visualized directly or after enhancement by conventional techniques.

IR sensors and imaging devices and IR modulating devices are described in U.S. Pat. Nos. 5,171,994, 5,168,338, 5,164,832, 5,159,198, 5,146,302, 5,130,259, 5,120,960, 5,120,664, 5,095,211, 5,087,816, 5,093,735, 5,151,595, 5,109,158, 5,099,120, 5,091,646, 5,079,420, 5,079,200, 5,047,644, 5,036,197, and Re 33,914, and in Blamoutier et al, *L'Onde Electric*, vol. 61, p. 25 (1981) and Butler et al, SPIE, vol. 930, p. 151 (1988), all of which are incorporated herein by reference.

Thus, an IR sensor or imaging device utilizing the present LB film of LCP may, e.g., take the form of a device in which the LB film disposed between a pair of electrodes is the pyroelectric material associated with a reading circuit on a semiconductor substrate, in which the substrate also supports conductive blocks which transmit electrical signals by the pyroelectric material toward the reading circuit, as described in U.S. Pat. No. 5,087,816.

A major advantage of the present invention is to permit the development of ultra-thin film displays by incorporating electrodes and a LCP film on the same substrate—this removes several processing steps involved in display fabrication. In addition, the electrodes themselves can be made using microfabrication techniques, so that addressable pixels can be fabricated on a substrate with this technology. Other advantages of the present invention are that a lower electric field strength and lower temperature are required for switching, compared to more standard (bulk) preparation of the same material. As shown below, experimental evidence demonstrates that films retain their ferroelectric characteristic on these substrates. The results also demonstrate that this new geometry yields switching times which are faster than what can be achieved for the same material in the usual SSFLC geometry.

Although the examples shown are for a limited class of LCPs, other LCs and LCPs and mixtures of these components may be used for the sample purpose; this includes using the various phases or states that LCs or LCPs exhibit, such as orthogonal (e.g., electroclinic) or tilted (e.g., ferroelectric, antiferroelectric) phases. Mixtures of LCPs with LCs with low molecular weight or other additives to achieve optimal viscosity and/or orientability may also be used with this device.

In a preferred embodiment, LCP films are deposited onto hydrophobic glass surfaces using the LB technique. Although this is the preferred technique for highest deposition control, other layering processes may be used for this purpose. Such processes include chemisorbed multilayers or standard bulk deposition. Methods to improve the deposition of the films on the substrate, including other hydrophobic treatments of the glass surface, may also be incorporated into this device.

In the following discussion, the advantages of the present devices are discussed in the context of a single LCP and an interdigitated array of electrodes. However, the same advantages may be obtained by using other LCPs and electrode arrangements.

The material used was 8PPB2-Co, a side-chain polysiloxane copolymer which exhibits the SmC* phase in the range from 128° C. to subambient temperatures (for the synthesis of the n=10 homologue of 8PPB2-Co see J. Naciri et al, *Liquid Crystals*, vol. 10, 585 (1991)). It has an average degree of polymerization $\overline{DP}_n=30$, and 30% of the backbone Si atoms are substituted with the mesogenic side chain. A computer-controlled film balance (KSV 5000) with alternate dipping capability was used to prepare the multilayer LB films (W. Rettig et al, *Macromol.*, vol. 24, 6539 (1991)). Monolayers of 8ppB2-Co were produced by spreading a chloroform solution of the copolymer onto a pure (>18 MΩ resistivity) water subphase of the Langmuir trough. These monolayers which show little isobaric creep and also very little hysteresis in compression vs. decompression experiments are characterized by excellent stability (W. Rettig et al, *Macromol.*, vol. 24, 6539 (1991); and W. Rettig et al, *Thin Solid Films*, vol. 210, 114 (1992)). Multilayers are produced by vertical transfers with a dipping speed of 5 mm/min and an applied surface pressure of 25 mN/m at T=27° C. onto the interdigitated electrode arrays.

Figure 4:
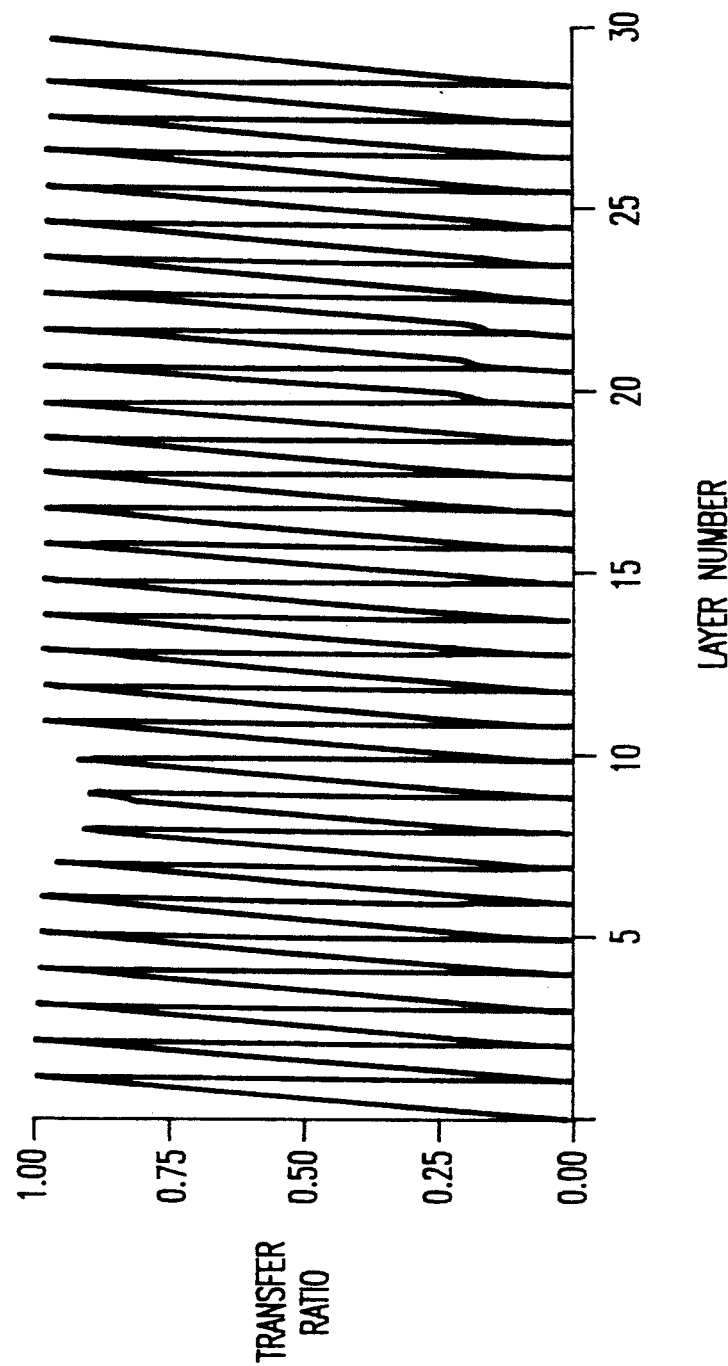
FIG. 4 shows the transfer ratios for the 30 successive depositions of 8PPB2-Co onto the hydrophobized and patterned substrate. The values for all subsequent depositions are close to 1 indicating complete monolayer transfer and formation of a uniform LB film.
Figure 5:
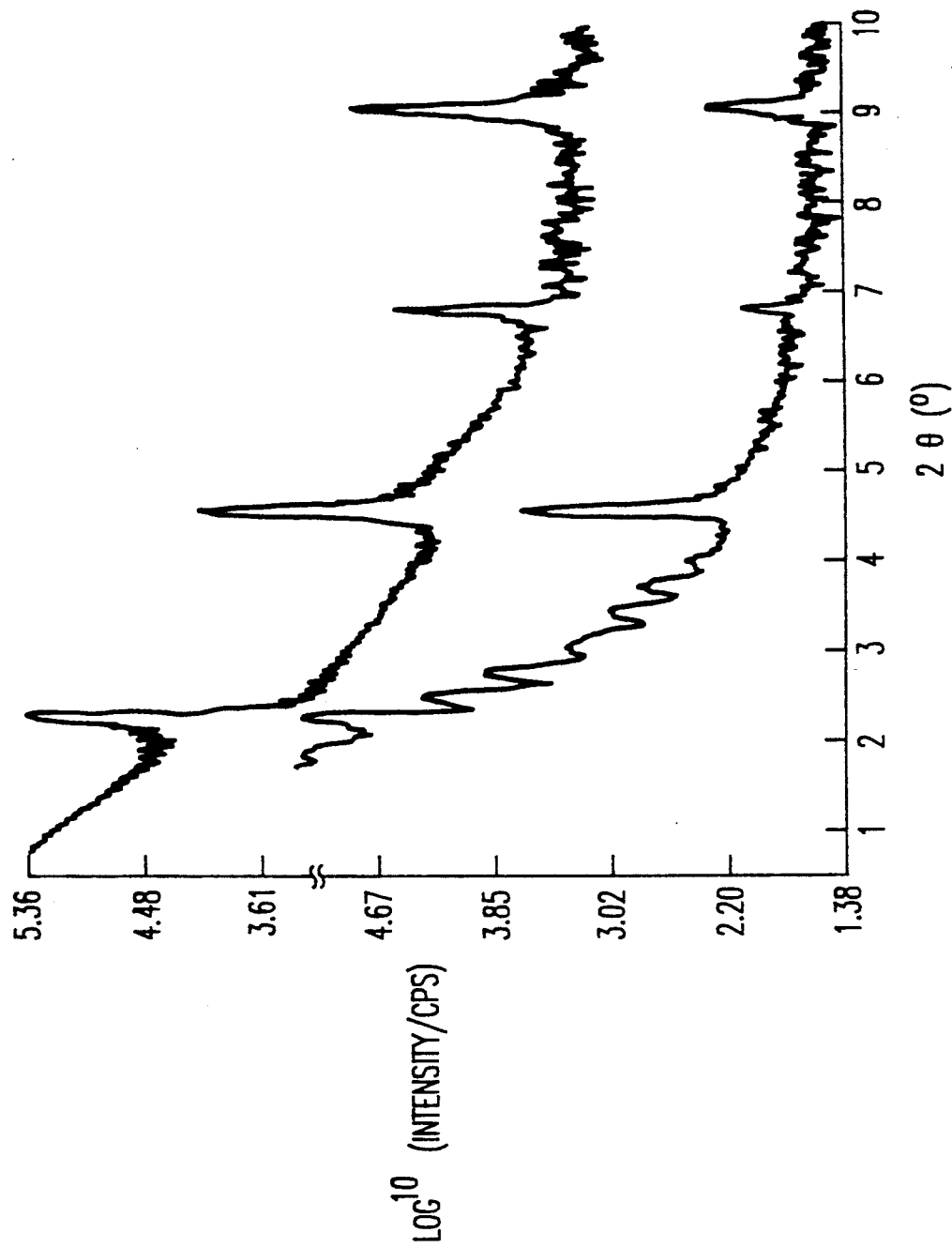
FIG. 5 illustrates the X-ray specular reflection scans of a 50-layer LB film of 8PPB2-Co; top: the LB film is deposited onto a Si wafer; bottom: the LB film is deposited onto the interdigitated electrode pattern. In both cases, four orders of diffraction maxima occurring at the same $2\theta$ values are observed.

The glass substrate of the arrays was hydrophobized with octadecyl trichlorosilane before dipping, and the substrates were oriented with their electrodes vertical to the water surface. The transfer ratio, a measure for the quality of the multilayers produced, is shown in FIG. 4. The transfer rate for the Y-type deposition used varied between 0.9 and 1.0 indicating an effective deposition of the 30 layer LB film. X-ray diffraction from the 30-layer LB film (FIG. 5) shows four orders in the diffraction for the smectic layering peak which indicates a high degree of lamellar order in the film. The X-ray data also show that the layers are parallel to the surface and have nearly the same layer spacing (3.84 nm) as the bulk SmC* sample (3.85 nm). Therefore, the deposited LB film has a tilted smectic structure which is a necessary condition for ferroelectricity.

Figure 6:
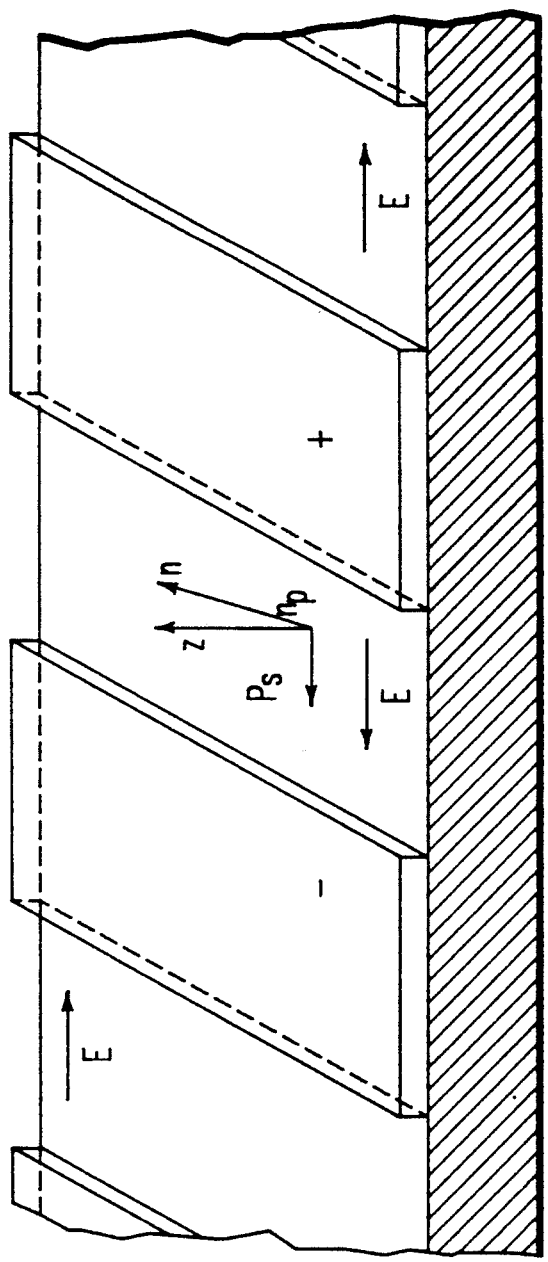
FIG. 6 shows the section of the electrode pattern and the LB film deposited in between the fingers. The electric field E is applied parallel to the smectic layers. a denotes the smectic layer normal, n the director, $n_p$ the projection of n onto the substrate plane, and $P_s$ the spontaneous polarization. The angle between director and layer normal is the tilt angle $\theta$.
Figure 7A:
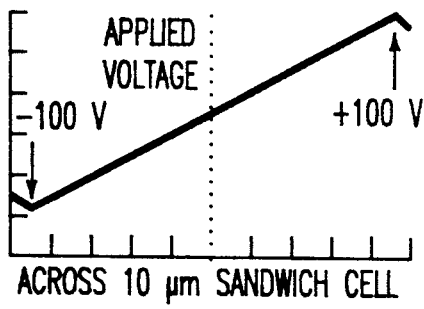
FIGS. 7a–7h illustrate the oscilloscope traces of the polarization current in the LB film (right) and in the sandwich cell (left) on applying a triangular wave electric field (top) of different frequencies. All traces are obtained at 70° C. with a field of 10 V/μm. At 28 Hz, a full peak is observed for film and bulk indicating a complete switching process, whereas with increasing frequency (60 and 120 Hz) only the onset of the bulk peak can be seen; the trace of the LB film sample exhibits its maximum even at 120 Hz. The vertical arrows indicate minimum and maximum of the applied voltage.
Figure 7E:
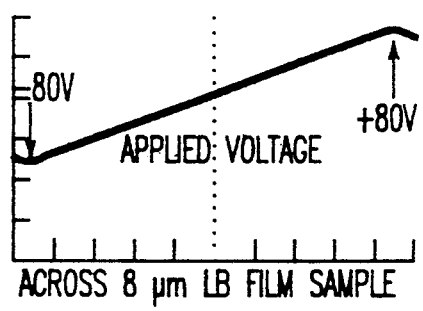
Figure 7B:
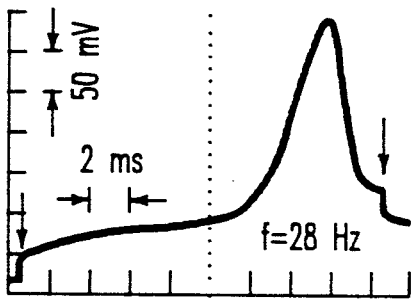
Figure 7F:
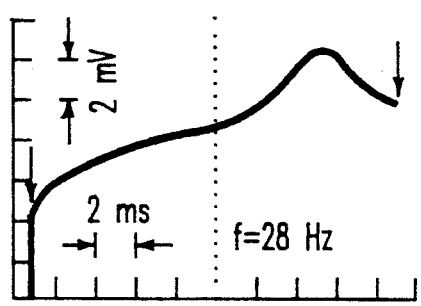
Figure 7C:
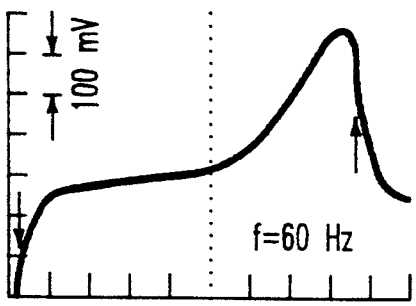
Figure 7G:
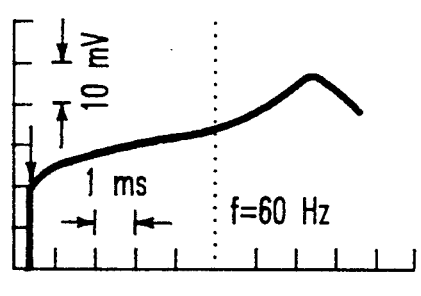
Figure 7D:
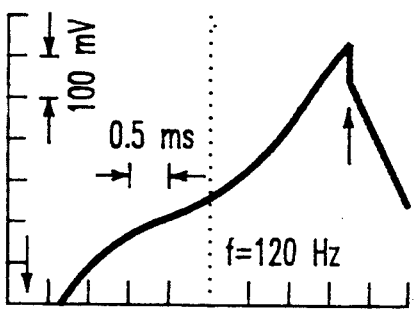
Figure 7H:
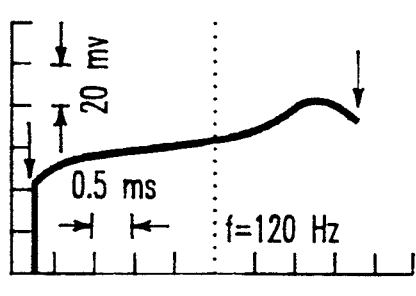

In the smectic LB film, the mesogenic side groups form a layered structure with the average orientation of their long axes, denoted by the director n (which is also the optical axis), tilted away from the layer normal z (FIG. 6). The director exhibiting a continuous degeneracy in its azimuthal orientation is lying on a cone coaxial with z. In the case of chiral molecules—like the mesogenic side group 8PPB2-Co —the SmC* phase exhibits a spontaneous polarization $P_s$ with its direction perpendicular to the (z,n) plane. On applying an electric field parallel to the SmC* layer, $P_s$ aligns with the field thereby breaking the symmetry of the azimuthal tilt degeneracy and producing macroscopically aligned domains. The projection of the director n of such a domain onto the substrate plane is denoted by $n_p$. The interdigitated gold electrodes, which are spaced 8 μm apart, allow application of a homogeneous electric field parallel to the smectic layers. The pattern consists of 500 electrode fingers, each of them being 9 mm long, 8 μm wide, and about 200 nm thick. The active cell area (0.005 cm$^2$) for the calculation of $P_s$ is given by this geometry and the thickness of the LB film, i.e., the number of transferred layers multiplied by the smectic layer spacing. $P_s$ of the sample was measured using the triangular wave method (K. Miyasato et al, *Jap. J. Appl. Phys.*, vol. 22, L661 (1983)) with an electric field (up to ±90 V) between the electrode fingers. The frequency range was from 550 Hz close to the SmC*-SmA transition (120° C.) to 1.2 Hz at 25° C. The current across the LB film was determined by measuring the voltage drop across a reference resistance with a storage oscilloscope. The polarization current was separated from ohmic and capacitive contributions and then integrated over time.

The polarization current traces of the LB film and of the sandwich sample are shown in FIGS. 7a–h. The triangular wave electric field applied to the electrode plates or interdigitated fingers causes a current across the sample which consists of three parts: The capacitive current $I_c$, the ohmic current $I_r$, and the polarization current $I_p$ due to the realignment of the spontaneous polarization. The current $I_c$, which is given by $I_c = C \cdot dU/dt$, causes a jump in the current trace across the cell at the time of slope reversal of the applied voltage. The ohmic (e.g., ionic) current ($I_r = U/R$) produces the linear background of the current trace whereas the reorientation of the $P_s$ vector (after the applied voltage has changed sign) results in the current peak. Clear current peaks are observed for the film. Although the polarization current of the film samples is more than 30 times smaller than of the sandwiched sample (the small thickness of the LB film reduces the active cell area and leads to a diminished signal-to-noise ratio), an unambiguous signal could be observed at all temperatures in the SmC* phase. Thus, it is clear that the LB film exhibits ferroelectric polarization.

By comparing the current traces obtained at different frequencies for the 30-layer film and the 10 μm bulk sample, it is seen (FIG. 7) that the switching process in the film follows the electric field to higher frequencies than the bulk sample. At 28 Hz, the switching process for both the LB film and the bulk material is completed before the applied voltage is reversed. On the other hand, there is a marked difference at 120 Hz. In case of the LB film, the signal regains the base line level—in contrast to the bulk sample before the slope of the applied triangular wave voltage is reversed. This indicates that the switching process in the LB film is faster than in the bulk. This striking difference is perhaps due to differences in the molecular anchoring at the substrate surface. In the case of the bulk material in the SSFLC geometry, the molecules, i.e., the mesogenic side chains have to overcome a planar anchoring at the two enclosing ITO electrode surfaces while in the case of the LB film, there is only one substrate surface which imposes a quasi-homeotropic orientation: The molecules can reorient more easily in the latter configuration.

There is another interesting feature with regard to the polarization current traces of the LB film (FIG. 7). The current-time integral as measure of $P_s$ decreases by about 47% on increasing the frequency from 28 Hz (100%) to 120 Hz. A possible explanation for this reduction is that the individual layers have a different switching speed depending on their distance to the substrate. The anchoring interaction with the substrate surface could slow down the molecular reorientation process due to viscous forces. At low frequencies, the mesogenic side chains in all film layers reorient whereas at higher frequencies, only the layers close to the free surface of the film can follow the field.

Figure 8:
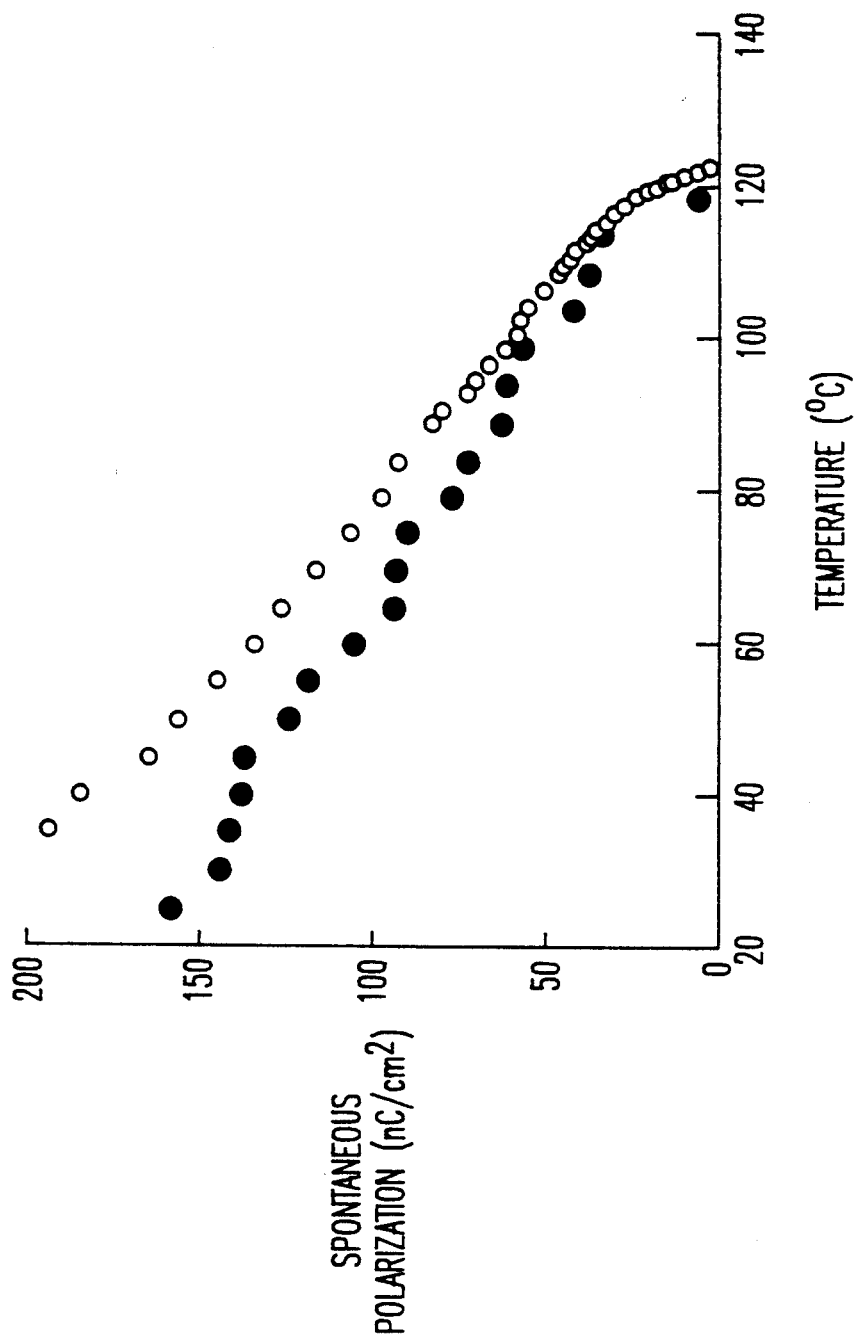
FIG. 8 shows the temperature dependence of the spontaneous polarization $P_s$ of the 30-layer LB film(●). The values of the bulk 8PPB2-Co sample (o) are given as comparison.

The magnitude as well as the temperature variation of $P_s$ of the LB film are compared with the corresponding data for the bulk in FIG. 8. The data for the LB film are essentially similar to those of the bulk indicating no major structural differences in the smectic layering or in the degree of dipolar order between bulk and film sample. This is supported by the results of X-ray investigations showing the same temperature dependence of the layer spacing in the SmC* phase for both bulk and film sample.

To study the electro-optic characteristics, the LB film sample is set in between the crossed polarizers of a transmission light microscope so that it can be rotated freely with respect to the polarizer. The viewing direction coincides with the smectic layer normal of the LB film. Changes in the light transmittance across the film on applying an electric field are measured with a photodiode. The photodiode current can be displayed on the oscilloscope as transmittance vs. time (optical trace). The optical trace is an average signal of the LB film samples in between at least 2 different electrode fingers.

Figure 9:
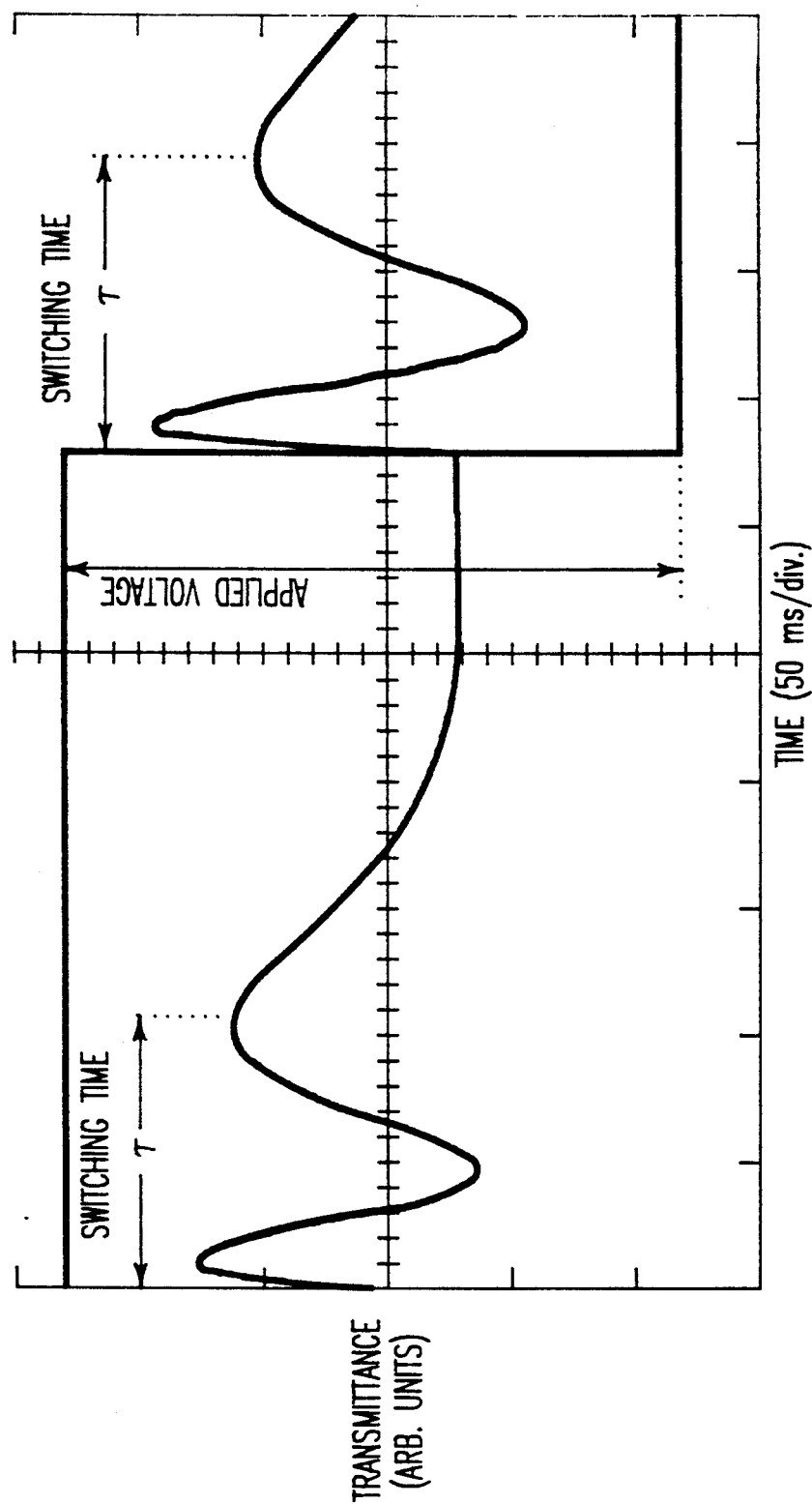
FIG. 9 shows the optical trace of the LB film sample in between crossed polarizers on applying a square wave electric field (U = ±50 V, f = 1.5 Hz, T = 30° C.). The direction of the electric field is parallel to the polarizer. On reversing the field, a narrow maximum (bright state) followed by a second broader maximum is observed.

Due to the homeotropic alignment of the smectic layers and due to the LB film being very thin, the optical changes on applying an electric field are subtle. The shape of the optical trace depends on the direction of the electric field with respect to the polarizers. If initially the sample is rotated such that the electric field is parallel to the polarizer, the sample is in a dark state (FIG. 9). When the field is reversed, the optical trace shows a narrow maximum (bright state) followed by a second broad maximum of slightly lesser amplitude. The final state of the sample has the same optical transmittance as the initial state. Again, reversing the field generates nearly the same optical trace.

If the sample is in a position such that the electric field and the polarizer form a 45° angle, an initial bright state is seen. The optical trace on reversing the electric field now consists of one sharp and another broad minimum (corresponding to dark states) before the final bright state is reached. A characteristic switching time $\tau$ can be defined as the time between field reversal and the second maximum (or minimum, dependent on the initial angular position).

Figure 10:
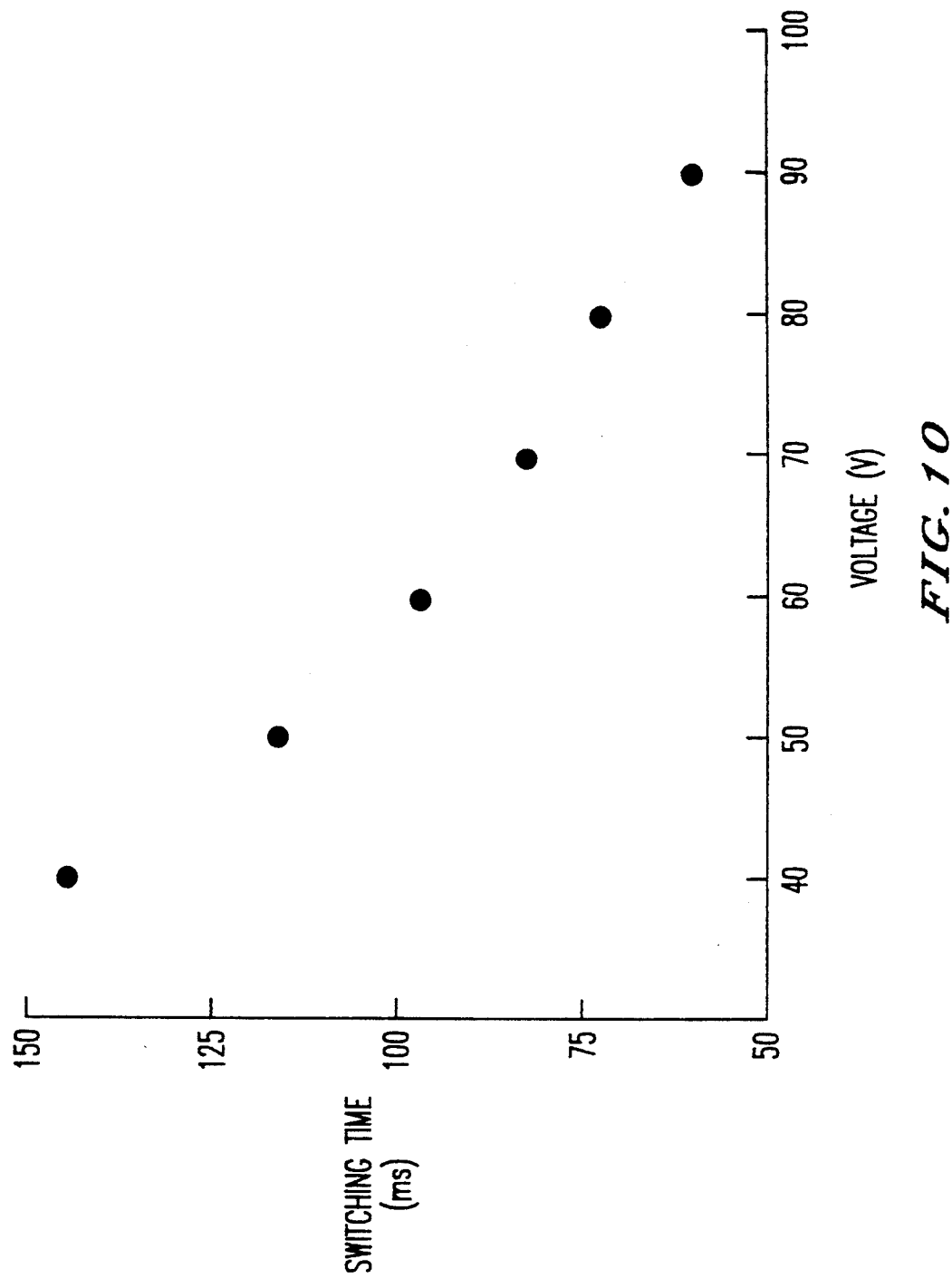
FIG. 10 shows the voltage dependence of the electro-optic switching time, $\tau$, for the LB film at T = 30° C. The switching time decreases with increasing voltage, approximately showing an inversely proportional dependence.

FIG. 10 shows the voltage dependence of $\tau$ for the 30-layer film at 30° C.; $\tau$ is seen to be approximately inversely proportional to the electric field. Also, the switching process in the film, especially at lower temperatures, can be induced with lower electric fields as compared to the bulk material in a sandwich cell.

The optical trace of the switching process can qualitatively be explained by considering the molecular motion constituting the ferroelectric reorientation. On reversing the electric field applied to the monodomain LB film sample, the mesogenic side chains perform a 180° rotation around the cone coaxial with z (FIG. 6). Simultaneously, the projection of the optical axis $n_p$ performs a 180° rotation in the substrate plane thereby passing different optical states. For $n_p$ parallel to the polarizer, a transmittance minimum is seen while for $n_p$ at a 45° angle to the polarizer, a maximum occurs. A quantitative description of the angular dependence of light transmittance through the LB film would have to take into account the distribution of angular velocities for different state of the switching and the fact that the experimental traces are the sum of different sample areas separated by the electrode fingers having opposite direction of the field and possibly different sense of rotation.

FIG. 11 shows the temperature dependence of the pyroelectric coefficient for a 30-layer LB film of 8PPB2-Co. It is seen that the pyroelectric coefficient is of considerable magnitude over the whole range of temperature so that at all temperatures from SmA-SmC* transition (at 125° C.) down to room temperature a considerable pyroelectric response can be seen. The magnitude of the pyroelectric coefficient is comparable to known pyroelectric materials. The results clearly establish that the present LB films exhibit pyroelectric properties even at a very low thickness (on the order of 1000Å or 0.1 μm).

Other features of the invention will become apparent in the course of the following descriptions of exemplary embodiments which are given for illustration of the invention and are not intended to be limiting thereof.

I. Electrode Fabrication and Preparation

To induce switching for the LB-deposited LCP film, finger electrodes that are interdigitated were utilized. These electrodes permit the application of an electric field parallel to the glass surface; the electrode is similar to that shown in FIG. 1a. Each of the fingers in a given set is connected to one of two bus lines and the two bus lines are parallel to each other spaced about 1 cm apart; the fingers in a given set run perpendicular from one of the bus lines and so are parallel to each other. Fingers on each set are 10μ wide, 9 mm long, and about 100 nm thick. The on-center spacing between fingers on a given set is 40μ so that the on-center spacing between the fingers of the two sets is 20μ. The distance from the first finger of set one to the last finger of set two is about 10 mm; there are about 250 fingers on each set. The bus lines for the two sets run to two separate contact pads.

These electrodes can be made using standard photolithography techniques; a thin layer of chrome (5 nm) is first evaporated onto the glass surface and then a layer of gold (100 nm) was evaporated onto the chrome. The interdigitated electrode pattern is transferred from a master mask to the chrome-gold using a standard photoresist-development process the photoresist that remains after development protects the metal under the pattern while the unprotected metal was etched in an acid bath. Photoresist is removed from the protected metal and the electrode (metal on glass) is thoroughly cleaned. Trichloro octodecylsilane was used to make the electrode hydrophobic and an LCP was deposited using the LB technique, as described below.

II. Film Deposition

Figure 3:
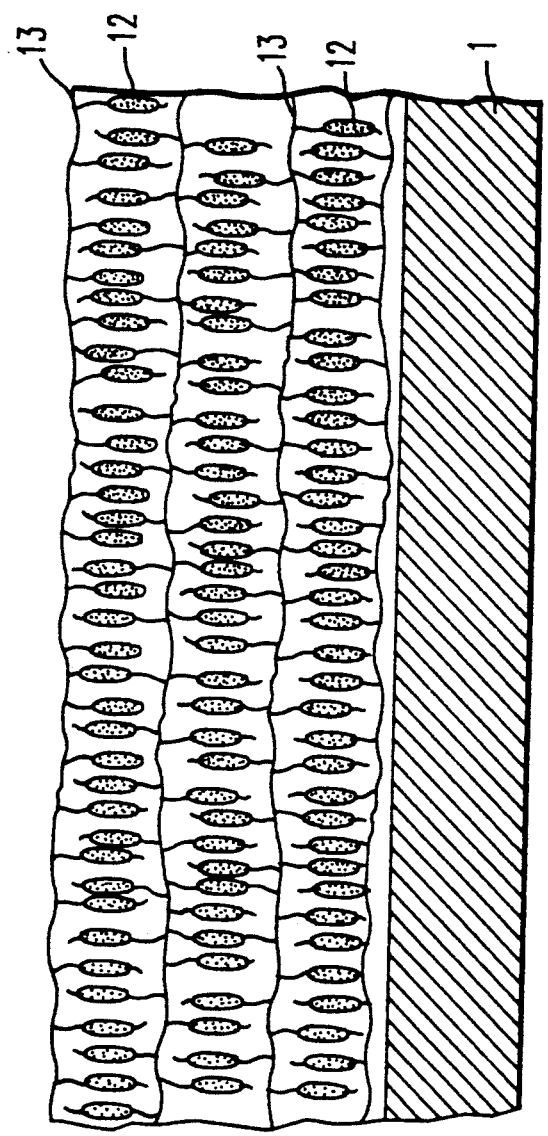
FIG. 3 illustrates a LB film of a LCP on a substrate.

Multilayers of LC and LCP films can be deposited onto the electrode substrate using a variety of methods, including bulk deposition or layering methods to control the number of layers deposited. For the examples described below, films were deposited using an LB technique: In brief, an LCP film was spread on a water surface and movable barriers were used to compress the film to a desired packing density. As the hydrophobic glass electrode is passed perpendicular through the compressed film, the LCP is deposited onto the substrate. Films up to 50 layers thick have been deposited onto hydrophobic glass slides; the film coating the electrode is depicted in FIG. 3.

III. Operation of Switching Device

To observe switching optically, the sample (LCP-coated electrode) is mounted on a transmission microscope stage within a polarizer and analyzer. The electrode is set between the polarizer and analyzer, which are usually crossed and may be freely rotated; the viewing direction described is normal to the plane of the sample. Different viewing geometries, e.g., tilting the sample relative to the normal, can also be used. The amount of transmitted light can be controlled by varying the angle between the analyzer and polarizer. Temperature of the sample is controlled on the mounting stage from below room temperature to temperatures that allow phase transitions in the films—e.g., from Smectic C to Smectic A transition and the liquid crystalline phase to the isotropic phase, where the film is destabilized and droplet formation occurs.

Switching is induced by applying an AC voltage to the contact pads of the two sets of parallel fingers; the applied AC voltage creates a field in the film, causing switching in the film. Changes in the transparency of the film can be observed with a photodiode or directly with naked eye in the viewport of a microscope. The photodiode current, which is a measure of the light transmitted through the sample, can be displayed on the oscilloscope as transmittance vs. time (the optical trace). The shape of the optical trace depends on the angular position of the electrode fingers (i.e., the direction of the electric field) with respect to polarizer and analyzer. If the electric field is initially parallel to the polarizer, the sample is in a dark state. When the field is reversed, the optical trace shows a narrow maximum (bright state) followed by a second broad maximum of slightly less intensity. The final state of the sample has the same optical transmittance as the initial state. A rotation of the sample about 45° leads to an initial bright state. The optical trace on reversing the field now consists of a sharp and another broad minimum (corresponding to dark states) before the final bright state is reached. A characteristic switching time can be defined as the time between field reversal and second maximum (or second minimum) of the optical trace. A dependence of the switching time on the electric field is seen for this switching process: with increasing field, the switching time decreases.

On applying a square wave voltage, it has been found that the sample starts switching at the time of field reversal. For a given setting, the sample changes from a dark to bright state, registered as a minimum to maximum transition in the optical trace: the bright state current (the maximum in the optical trace) is independent of voltage, but the dark state current (the minimum in the optical trace) is voltage-dependent. The width of the dark state current decreases with increasing electric field, indicating a faster switching at higher fields. The minimum in the photocurrent as well as the contrast between maximum and minimum transmission is more pronounced with increasing field, possibly due to more uniform switching at higher fields. On applying a triangular voltage, a different switching behavior as well as a different optical trace is observed from the square wave response. For the triangle wave input at a given setting of the sample with respect to the polarizer, a change in transmittance is observed only after the applied field changes sign on passing through zero volts. A change in sign (zero crossing) initiates the switching process; however, the rate of change of the state is a function of field magnitude.

The voltage dependence of the switching time, as well as the observation of two extrema in the optical trace, demonstrate that the underlying process is ferroelectric switching, i.e., it is a reorientation of the spontaneous polarization coupled to the rotation of the mesogenic side chains on reversing the electric field. In addition to the optical signal, the electrical signal corresponding to the spontaneous polarization of a ferroelectric sample has unambiguously been observed in samples. The implication of observing ferroelectricity in a sample is that pyroelectric-based detectors may be fabricated with this technique.

EXAMPLES

Example 1

A film of the LCP 8-PPB2-CO (n=8 in FIG. 2) was prepared as described above and switching was optically observed at room temperature with a square wave input of ±10 V at 1 Hz. The sample was heated to 120° C. and switching was still readily observed. At 70° C., the voltage dependence of the optical switching was measured at ±10, ±20 V, ±30V, and ±40 V magnitude; the time for overall switching change (from photocurrent minimum to 90% photocurrent maximum) was 13.0 ms, 10.9 ms 9.2 ms, and 8.4 ms, respectively. Switching time was found to be dependent on frequency of the applied square wave signal; at a magnitude of ±20V, the switching times of a 12, 24, and 60 Hz signal were 15.4 ms, 11.0 ms, and 6.6 ms, respectively. Switching times for a triangle wave of magnitude +40 V at 24 Hz, 70° C. was slightly longer than for the square wave under the same conditions.

Example 2

A film of the LCP 6-PPB2-CO was prepared as described above. Switching in these samples was observed optically at 30° C. with a square wave of ±40 V at 5 Hz. These films were also 50 monolayers thick.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A liquid crystal device comprising:
   (a) substrate;
   (b) at least one pair of electrodes disposed on said substrate; and
   (c) a Langmuir-Blodgett film of a liquid crystal polymer disposed on said substrate between said at least one pair of electrodes.
2. The device of claim 1, wherein said substrate comprises a material selected from the group consisting of glass, quartz, silica, ceramics, and plastic.
3. The device of claim 1, wherein said electrodes comprise a material selected from the group consisting of gold, silver, copper, and aluminum.
4. The device of claim 1, wherein said electrodes comprise gold.
5. The device of claim 1, wherein said liquid crystal polymer is a liquid crystal polymer with side chain mesogenic groups.
6. The device of claim 1, wherein said liquid crystal polymer is a compound of the formula (I)

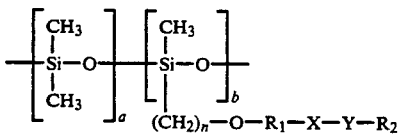

wherein monomer a is present in an amount of 0.1 to 0.9 mole % and monomer b is present in an amount of 0.1 to 0.9 mole % and wherein $R_1$ is 1,4-phenylene or 4,4'-biphenylene; X is —COO— or —OCO—; Y is

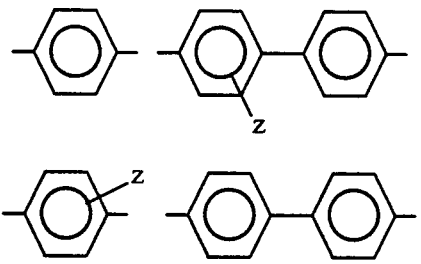

and $R_2$ is

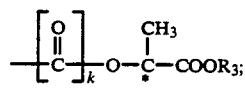

in which k is 0 or 1; * denotes an optically active center; Z is $NO_2$, F, or Cl; $R_3$ is $C_lH_{2l+1}$, —*$CH(CH_3)C_pH_{2p+1}$ —$CH_2C_qF_{2q+1}$, —*$CH(CH_3)COOC_tH_{2t+1}$ (l and p are each independently an integer of from 1 to 10 and q and t are each independently an integer of from 1 to 6); and n is an integer of 4 to 12.

7. The device of claim 6, wherein the ratio b/(a+b)=0.2 to 0.8.
8. The device of claim 6, wherein the ratio b/(a+b)=0.2 to 0.4.
9. The device of claim 6, wherein the said liquid crystal polymer has a $\overline{DP}_n$ of 5 to 75.
10. The device of claim 1, wherein said Langmuir-Blodgett film comprises 1 to 120 layers of said liquid crystal polymer.
11. The device of claim 1, wherein said Langmuir-Blodgett film comprises 5 to 50 layers of said liquid crystal polymer.
12. An infrared detector, comprising:
   (a) substrate;
   (b) at least one pair of electrodes disposed on said substrate; and
   (c) a Langmuir-Blodgett film of a liquid crystal polymer disposed on said substrate between said at least one pair of electrodes.
13. The detector of claim 12, wherein said electrodes comprise a material selected from the group consisting of gold, silver, copper, and aluminum.
14. The detector of claim 12, wherein said electrodes comprise gold.
15. The detector of claim 12, wherein said liquid crystal polymer is a liquid crystal polymer with side chain mesogenic groups.
16. The detector of claim 12, wherein said liquid crystal polymer is a compound of the formula (I)

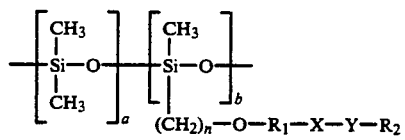

wherein monomer a is present in an amount of 0.1 to 0.9 mole % and monomer b is present in an amount of 0.1 to 0.9 mole % and wherein $R_1$ is 1,4-phenylene or 4,4'-biphenylene; X is —COO— or —OCO—; Y is

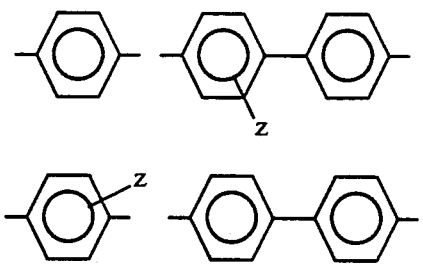

and $R_2$ is

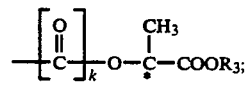

in which k is 0 or 1; * denotes an optically active center; Z is $NO_2$, F, or Cl; $R_3$ is $C_lH_{2l+1}$, —*$CH(CH_3)C_pH_{2p+1}$ —$CH_{2l}$ $C_qF_{2q+1}$, —*$CH(CH_3)COOC_tH_{2t+1}$ (l and p are each independently an integer of from 1 to 10 and q and t are each independently an integer of from 1 to 6); and n is an integer of 4 to 12.

17. The detector of claim 16, wherein the ratio b/(a+b)=0.2 to 0.8.

18. The detector of claim 16, wherein the ratio b/(a+b)=0.2 to 0.4.

19. The detector of claim 16, wherein the said liquid crystal polymer has a $\overline{DP}_n$ of 5 to 75.

20. The detector of claim 12, wherein said Langmuir-Blodgett film comprises 1 to 120 layers of said liquid crystal polymer.

* * * * *